(No Model.)
S. G. HILL & P. M. McCORMICK.
FEED WATER HEATER.
No. 542,890. Patented July 16, 1895.
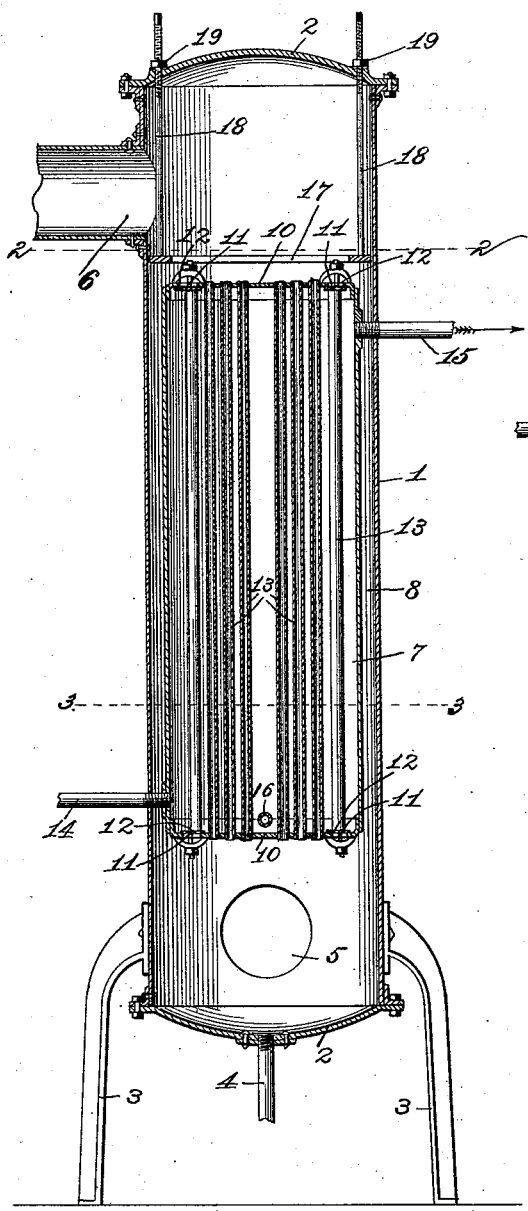
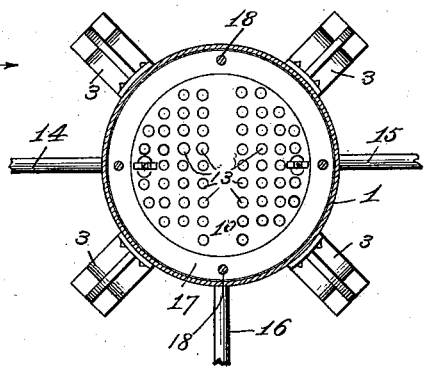
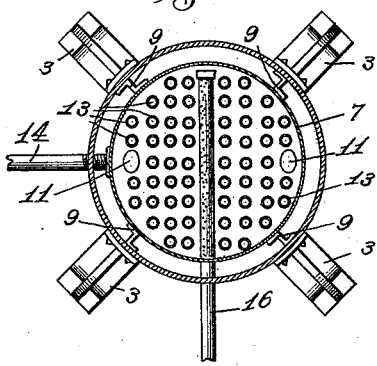
Attest,
John L. Tunison
M. F. Smith
Inventors
Samuel G. Hill
Preston M. McCormick
By Higdon & Higdon & Longan
Attys.

UNITED STATES PATENT OFFICE.

SAMUEL G. HILL AND PRESTON M. McCORMICK, OF ST. LOUIS, MISSOURI.

FEED-WATER HEATER.

SPECIFICATION forming part of Letters Patent No. 542,890, dated July 16, 1895.

Application filed April 8, 1895. Serial No. 544,893. (No model.)

*To all whom it may concern:*

Be it known that we, SAMUEL G. HILL and PRESTON M. McCORMICK, of the city of St. Louis and State of Missouri, have invented certain new and useful Improvements in Water-Heaters, of which the following is a full, clear, and exact description, reference being had to the accompanying drawings, forming a part hereof.

Our invention relates to feed-water heaters; and it consists in the new and novel features of construction and arrangement of parts more fully hereinafter specified and claimed.

In the drawings, Figure 1 is a vertical sectional view of a feed-water heater, the same being constructed in accordance with our invention. Fig. 2 is a cross-sectional view taken approximately on the indicated line 2 2 of Fig. 1. Fig. 3 is a horizontal sectional view taken approximately on the indicated line 3 3 of Fig. 1.

Referring by numerals to the accompanying drawings, 1 indicates a casing or cylinder of any suitable size and form, the same being constructed with removable caps 2. This casing or cylinder 1 is mounted upon suitable legs or standards 3, and discharging from the lower end of said casing is a drip-pipe 4.

Entering the lower end of the casing 1 is an inlet connection 5 of any suitable size and form, and discharging from the upper end of the casing is an outlet connection 6, identical in size and form with the inlet connection 5.

Located within the casing 1 and between the inlet and outlet connections is a cylinder or casing 7, the same being of a slightly-smaller diameter than is the casing 1, thereby forming an annular space 8 between said casings or cylinders. This inner casing or cylinder 7 is rigidly secured in proper position by angle-brackets 9 that are vertically arranged in the annular space 8 and are riveted to the inner casing 7 and the outer casing 1. Riveted to the ends of the inner casing 7 are heads 10, in which are suitably located hand-holes 11, the same being normally closed by hand-hole plates 12 of common construction. A series of tubes or pipes 13 extend from one head 10 to the other, and are rigidly fixed in said heads in any suitable manner.

Passing through the wall of the casing 1 and entering the casing 7 at any suitable point near the bottom thereof is a tube or pipe 14, which discharges from a suitable water-supply into said casing 7. Discharging from the interior of the casing 7 and passing through the wall of the casing 1 is a tube or pipe 15 that leads to the boiler.

Located in the bottom of the casing 7 is a perforated tube or pipe 16 that passes through the wall of the casing 7, through the wall of the casing 1, and discharges at any suitable point. This pipe 16 performs the function of a blow-off pipe.

Located upon the interior of the casing 1 and above the casing 7 is a ring 17, the diameter of which is equal to the interior diameter of the casing 1. This ring is adapted to be located adjacent the top head 10 of the casing 7, and when in such position will cut off and close the passage through the annular space 8 between the casings 1 and 7. Loosely fixed to this ring and extending vertically upward therefrom and through screw-threaded apertures in the top cap 2 of the casing 1 are vertical rods 18, the upper ends of which are screw-threaded and adapted to receive thereon nuts 19. By manipulating these rods or nuts the ring 17 can be raised or lowered, as desired, said ring really performing the function of a valve.

The operation is as follows: The cold water is forced by means of a pump or in any suitable manner from the water-supply through the pipe 14 and into the interior of the casing 7. Here it is free to circulate around the tubes 13, and when it has filled said casing 7 it will discharge through the pipe 15 to the boiler. The exhaust-steam enters the casing 1 through the inlet connection 5, and said exhaust-steam passes upward through the pipes 13 and through the annular space 8 between the casings 1 and 7. After said steam passes through the tubes 13 and annular space 8 it dischages through the dischage connection 6. As said exhaust-steam passes through the tubes 13 and the annular space 8 the water within the casing 7 will be very efficiently and completely heated, thus securing the desired result. Should the steam tend to pass through the annular space 8 and not through the pipes or tubes 13, the nuts 19 on the outside of the top cap 2 and the vertical rods 18 are so manipulated as that the ring 17 will be lowered and located adjacent the head 10 at the top of the casing 7, thereby cutting off to a certain degree the passage of said steam through the annular space 8, and necessarily causing a circulation of the steam through the pipes 13. Any condensation of the steam or leakage from the casing 7 will be discharged through the pipe 4.

To clean the casings 1 and 7 and the tubes or pipes 13, one of the caps 2 is removed from the casing 1, which, as may be readily perceived, gives free access to the interior of said casing and to the exterior of the casing 7 and tubes passing therethrough.

To clean the interior of the casing 7 the handhole plates 12 are removed in the usual manner.

A feed-water heater of this construction is simple in construction, of minimum cost, and possesses superior advantages in point of simplicity, durability, and general efficiency.

What we claim is—

1. In a feed water heater, a vertically arranged casing closed at both ends and constructed with suitable inlet and outlet connections, a casing having closed ends located within the first mentioned casing in such a manner as to form an annular space between said casings, suitable water inlet and discharge connections to said inner casing, a series of tubes passing through said inner casing, a blow-off pipe discharging from the interior of said inner casing, and a valve adapted to close the passage through the annular space between the two casings.

2. In a feed water heater, the combination of an outer casing closed at both ends, suitable inlet and outlet connections for said casing, an inner casing closed at both ends and so located within the outer casing as that an annular space is formed between said casings, and a ring located above the inner casing and adapted to be so manipulated as to close the passage through the annular space between the two casings.

3. In a feed water heater, the combination of the outer casing 1, the inner casing 7 so located as that an annular space is formed between said casings, a ring located above the casing 7 and moving vertically within the casing 1, rods 18 passing through the top cap of the outer casing, the ends of said rods being screw-threaded, and nuts mounted upon said screw-threaded ends outside the cap, for raising and lowering said rods and ring.

In testimony whereof we affix our signatures in presence of two witnesses.

SAML. G. HILL.
PRESTON M. McCORMICK.

Witnesses:
EDWARD E. LONGAN,
JOHN C. HIGDON.